P. O. TRAHAN.
SAFETY ATTACHMENT FOR TRACTORS.
APPLICATION FILED MAY 27, 1920.
1,409,043.
Patented Mar. 7, 1922.
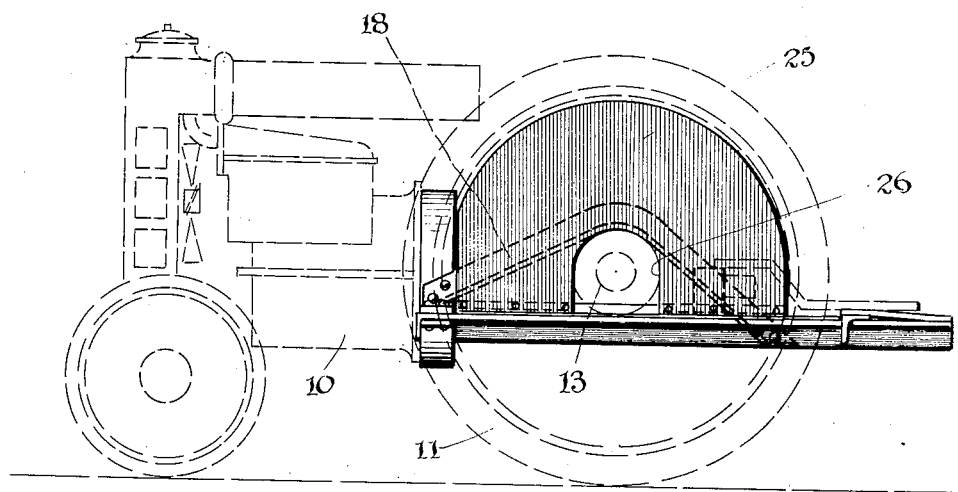
Fig. 1
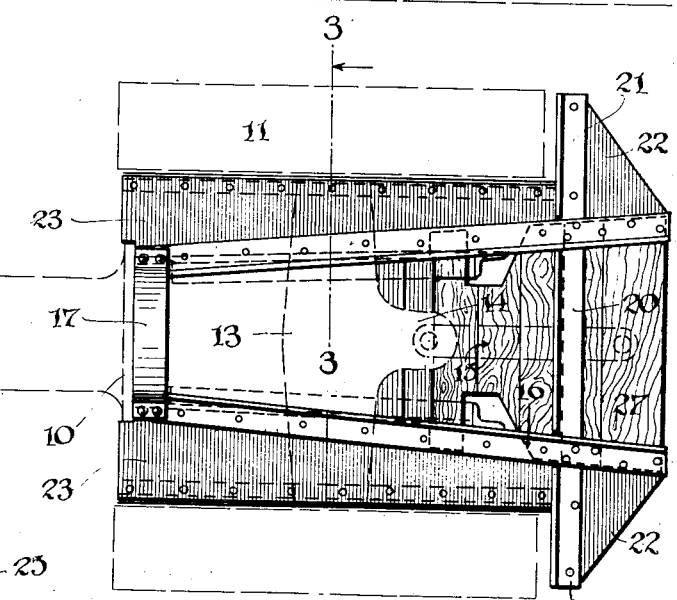
Fig. 2
Fig. 3
WITNESSES
INVENTOR
Paul O. Trahan.
BY
ATTORNEYS

UNITED STATES PATENT OFFICE.

PAUL O. TRAHAN, OF GUEYDAN, LOUISIANA.

SAFETY ATTACHMENT FOR TRACTORS.

1,409,043.  Specification of Letters Patent.  Patented Mar. 7, 1922.

Application filed May 27, 1920. Serial No. 384,767.

*To all whom it may concern:*

Be it known that I, PAUL O. TRAHAN, a citizen of the United States, and a resident of Gueydan, in the parish of Vermilion and State of Louisiana, have invented a new and useful Improvement in Safety Attachments for Tractors, of which the following is a specification.

My present invention relates generally to tractors and more particularly to a type of tractor of well known manufacture, my object being the provision of a simple, readily attachable device capable of use without inconvenience in connection with the tractor and which will operate to prevent overturning of the machine as well as engagement between a trailing implement and the tractor wheels in making sharp turns.

A further object is the provision of an attachment which will protect the operator from mud, dirt, stones and the like thrown upwardly by the spokes of the traction wheels, as well as means by which the operator is protected from injury by the traction wheels in case he is thrown from his seat or station.

With the above in mind, my invention resides in the attachment shown in the accompanying drawing in which Figure 1 is a side view illustrating the practical application of my invention, Figure 2 is a bottom plan view thereof, and Figure 3 is a detail cross section taken on line 3—3 of Figure 2.

Referring now to these figures I have shown in Figures 1 and 2 parts of a "Fordson" tractor in which the transmission housing appears at 10, the rear traction wheels at 11, and the differential casing at 13, the latter having a rearwardly projecting lug 14 as shown in Figure 2, to which the forward end of the draw-bar 15 is pivoted so that the latter may swing in a horizontal plane.

My improvements propose an attachable frame including a pair of forwardly converging side bars 16, the rear ends of which in the attached position project rearwardly of the traction wheels 11, and the forward ends of which are rigidly secured between the flanged connected ends of semi-circular straps 17 bolted or riveted together around the transmission housing 10. These side bars 16 extend horizontally and rearwardly beneath the differential casing 13 in straight lines and rearwardly of the differential casing receive the rear ends of truss bars 18 bent to centrally overlie the rear axle housing at opposite sides of the differential casing. The forward portions of these truss bars incline downwardly and their forward ends are secured to the transmission case embracing straps 17. Thus by virtue of the connection of the forward ends of the side bar 16 of the frame to the transmission case embracing straps 17, and the bracing of the side bars by virtue of the truss bars 18 extending over the rear axle housing it is obvious the side bars and thus the frame of the platform will be rigidly supported in place.

The frame of the platform also includes a rear transverse bar 20 securely fastened to the rear portions of the side bars 16 with its ends 21 projecting across the faces of the traction wheels 11 and connected at their extremities by triangular rigid webs 22 with the rear extremities of the side bars 16. These rear webs form steps making it easier for the operator to reach his seat and also provide bearing extensions which in case of lifting of the forward portion of the tractor, come into engagement with the surface of the ground and prevent overturning of the tractor and resulting injury to the operator.

It is obvious that if for any reason the front of the machine is elevated either by virtue of the inequality of the ground or the pull of the load, the webs of the frame at the rear of the wheels will engage the surface of the ground and by relieving the pressure of contact between the wheels and the ground, allow the wheels to slip in much the same manner as if the clutch were released, permitting the machine to right itself at once and avoiding all danger of rearward overturning.

The side plates 23 of the platform are secured along their inner edges to the side bars 16 of the frame and extend from the transmission case embracing straps 17 to the rear cross bar 20, in the space between the side bars and the inner faces of the wheels at points below the horizontal plane of the wheel axes. Along the outer edges and the upper surfaces of these side plates 23 are secured angle irons 24 to which are also secured the lower edges of semi-circular shields 25 extending upright at the inner faces of the wheels as clearly seen by a comparison of Figures 1 and 3, these side shields having central slots 26 to receive the rear axle housings and serving to perform the functions of fenders in preventing stones, dirt and mud from being thrown upwardly onto the platform and against the operator when the machine is in movement. These shields 25 also function to prevent injury of the operator in case he is unseated and thrown against one of the wheels.

The space between the rear portions of the side bars 16 is covered in practice by a removable platform body 27 seen in Figure 2, which may be readily removed at any time desired, so that it is obvious the entire arrangement acts for the safety of the operator as well as for his greater comfort in operation, and may be positioned readily and without danger of interfering with the operating parts of the tractor.

It is further obvious that my invention provides a strong and durable arrangement as well as one including portions which act as steps to permit of convenient climbing onto and alighting therefrom.

It is also obvious that the safety frame as proposed by my invention is readily attachable, is positioned without danger of interfering with the operating parts of the tractor and will be strong and durable in use.

I claim:—

1. The combination with a tractor having rear traction wheels, a rear axle casing and a transmission housing, of a frame including side bars extending in straight lines beneath the rear axle casing, means connected to said side bars intermediate their ends for clamping engagement around the rear casing, means at the forward ends of the side bars clamped around the transmission housing, a cross bar secured to the side bars and beyond which the rear extremities of the latter extend, the outer ends of said cross bar projecting beyond the side bars and extending across the faces of the traction wheels at the rear thereof, and angular webs connecting the said projecting ends of said cross bar with the said rear extremities of the side bars and forming steps for mounting the tractor between the same and a trailer.

2. The combination with a tractor including rear traction wheels, a rear axle casing and a transmission housing, of a frame having connections for clamping engagement with the said axle casing extending rearwardly therebeneath, a ring clamped around the transmission housing and to which the frame is attached at its forward end, said frame including side bars and a rear cross bar the latter extending across the side bars and across the rear faces of the traction wheels and webs connecting the cross bar and the side bars at the rear of the traction wheels, and located at the rear of the wheels to form steps.

PAUL O. TRAHAN.

Witnesses:
Wm. Williams,
Wyett Brussard.